United States Patent [19]
Carlile et al.

[11] Patent Number: 5,449,129
[45] Date of Patent: Sep. 12, 1995

[54] PROPULSION SYSTEM FOR A LIGHTER-THAN-AIR VEHICLE

[75] Inventors: David E. Carlile, Lancaster; Mark H. Wexler, Studio City, both of Calif.

[73] Assignee: Lockheed Corporation, Calabasas, Calif.

[21] Appl. No.: 198,722

[22] Filed: Feb. 18, 1994

[51] Int. Cl.$^6$ ............................................. B64B 1/26
[52] U.S. Cl. ...................................... 244/26; 244/52; 244/55; 244/60
[58] Field of Search ....................... 244/25, 26, 30, 52, 244/55, 60, 56, 66

[56] References Cited

U.S. PATENT DOCUMENTS

| | | | |
|---|---|---|---|
| 1,019,635 | 3/1912 | Harlow. | |
| 1,677,688 | 7/1928 | Rees. | |
| 1,868,976 | 4/1931 | Hall. | |
| 1,876,153 | 9/1932 | Spurrier. | |
| 1,879,345 | 4/1929 | Lawrence. | |
| 3,179,354 | 4/1965 | Alvarez-Caldera | 244/56 |
| 3,451,648 | 8/1967 | Pabst | 244/74 |
| 3,547,379 | 12/1970 | Kappur et al. | 244/55 |
| 3,614,034 | 7/1969 | Townsend | 244/56 |
| 4,116,405 | 9/1978 | Bacchi et al. | 244/55 |
| 4,402,475 | 9/1983 | Pavlecka | 244/96 |
| 4,891,029 | 1/1990 | Hutchinson | 446/58 |
| 5,026,003 | 6/1991 | Smith | 244/26 |

FOREIGN PATENT DOCUMENTS 26897 of 1912 United Kingdom.
2250007 12/1991 United Kingdom.

*Primary Examiner*—Galen L. Barefoot

[57] ABSTRACT

The invention is a propulsion system for a lighter-than-air vehicle, the vehicle having a longitudinal, lateral and vertical axis. In detail, the propulsion system includes a thrust producing assembly rotatably mounted on the vehicle, the assembly rotatable about an axis of rotation in a plane at an acute angle to the vertical axis of the vehicle, the assembly rotatable in the plane from a position wherein the thrust axis of the assembly is aligned with the longitudinal axis to a position at least plus or minus ninety degrees thereto. A powerplant assembly is coupled to the thrust producing assembly to provide power thereto. The powerplant assembly includes a fuel efficient powerplant assembly mounted within the vehicle having sufficient power for cruise conditions, the fuel efficient powerplant having a output drive shaft coupled to the thrust producing assembly. A light weight, high power powerplant assembly is mounted directly to the thrust producing assembly having sufficient power for docking conditions. A first clutch is provided for de-coupling the fuel efficient powerplant from the thrust producing assembly and a second clutch means for decoupling the light weight, high power powerplant from the thrust producing assembly. An actuation system is provided for rotating the thrust producing assembly about the axis of rotation.

10 Claims, 6 Drawing Sheets

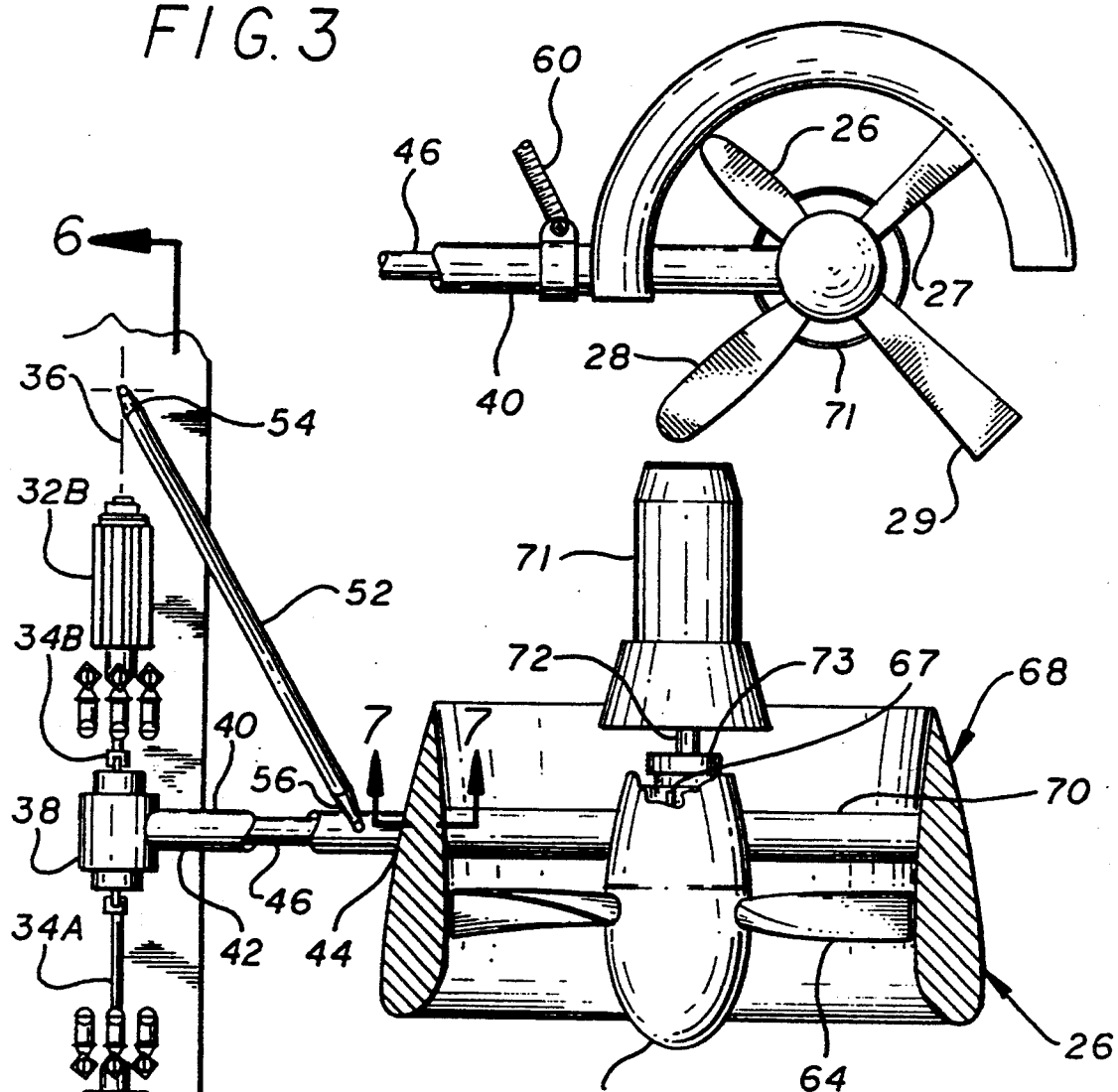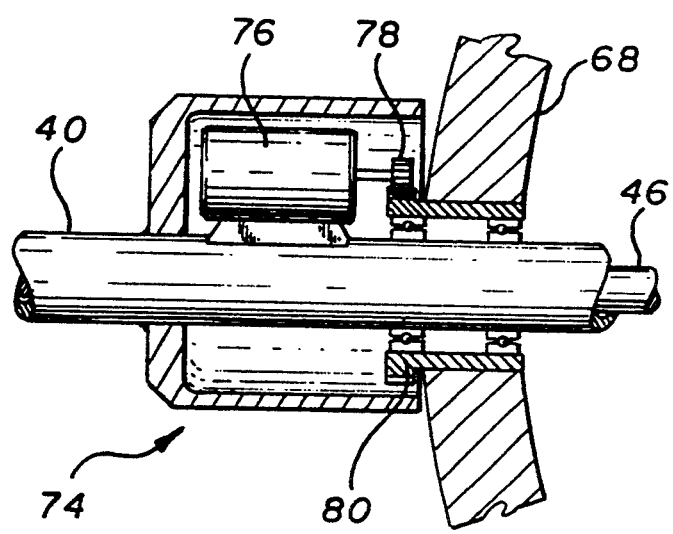

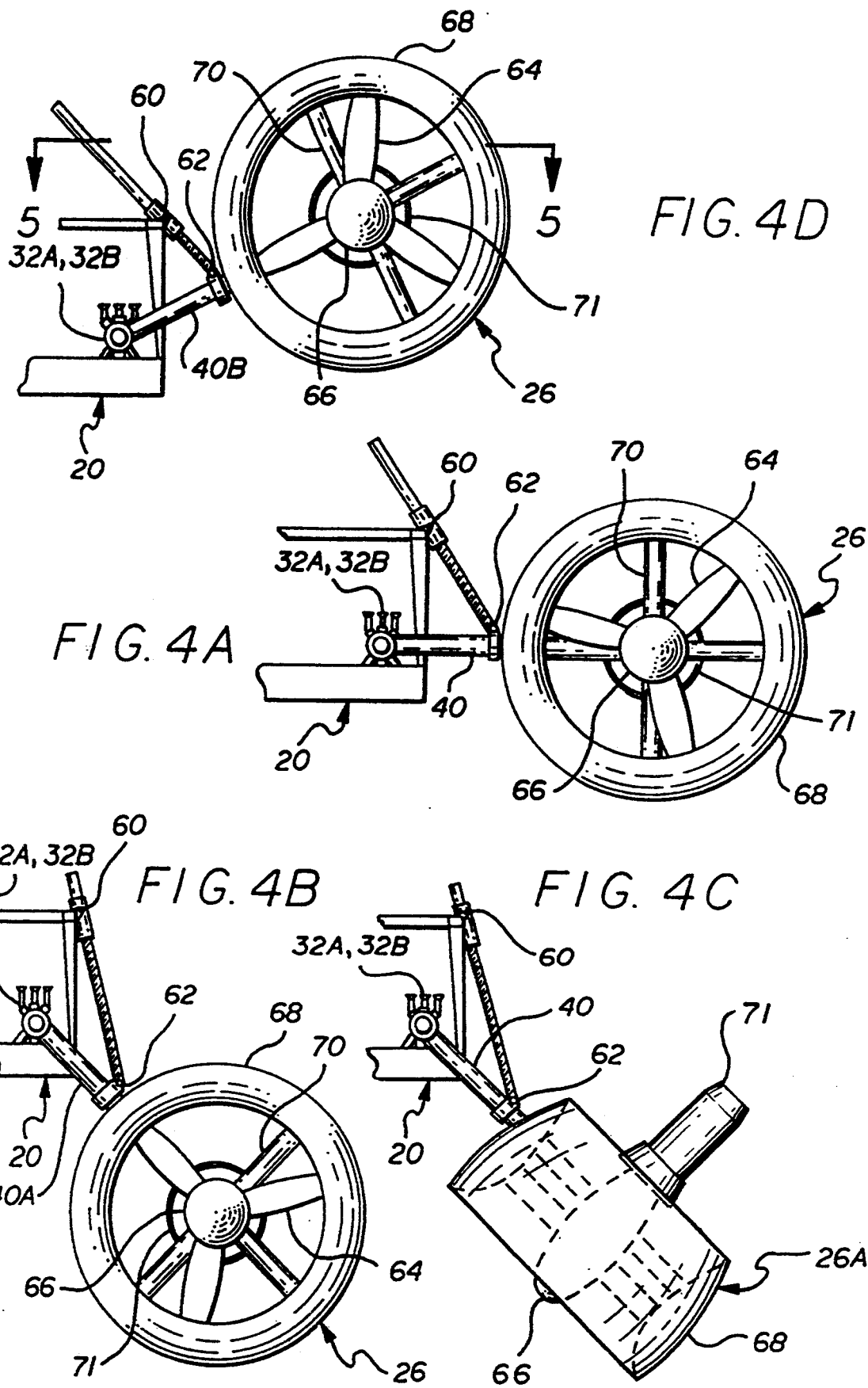

PROPULSION SYSTEM FOR A LIGHTER-THAN-AIR VEHICLE

BACKGROUND OF THE INVENTION

1. Field of the Invention

The invention relates to the field of propulsion systems for lighter-than-air vehicles and, in particular, to a propulsion system that provides maneuvering and thrust vectoring control.

2. Description of Related Art

There are three general types of non-rigid vehicles: those comprising a single gas filled bag; several gasbags joined together in series; and, of course, those having a multiple number gasbags within a non-rigid envelope. A particular problem with such non-rigid vehicles is that, because of the lack of rigid structure within the gasbag, the placement of the thrust assemblies is limited to the gondola. Thus, because the gondola is suspended from the bottom of the vehicle, any maneuvering forces generated by the propulsion system can not act through the center of pressure of the vehicle and, therefore, their effectiveness is reduced. This is also generally true of rigid airships that have an internal structure defining the shape of the vehicle that contain a plurality of gasbags with an aerodynamic cover there over. Even though the propulsion system can be mounted almost anywhere on the rigid structure, they are most often mounted at or near the bottom of the vehicle for ease of access, etc. Thus what is needed is a propulsion system wherein all these control problems are addressed while inducing a minimum weight addition to the vehicle. Another major problem with both rigid and non-rigid lighter-than-air vehicles is their limited ability to station keep and/or maneuver when docking, especially if there are any significant cross-winds. This is due primarily to their large cross-sectional area, which causes the vehicle to "weather vane" and "wave" with the wind. They are particularly difficult to control if the wind is gusting or when there are significant up or down drafts. In fact, docking has proven to be the most difficult portion of a flight for a lighter-than-air-vehicle.

In the past reversible propellers have been used to provide braking as well as differential thrust for directional control, but have proven to be only marginally effective. Side thrusters in the form of ducted fans or propellers are more effective, but when dedicated solely for docking and "take off", the vehicle clearly incurs a significant weight penalty. Examples of these can be found in U.S. Pat. Nos. 1,876,153, "Aerial Transportation Apparatus" by S. O. Spurrier and 4,402,475, "Thrusters for Airship Control" by V. H. Pavlecka. Dedicated vertical lift propellers have also been used to provide additional lift at take off; however, the same weight penalty is encountered. Examples of these can be found in U.S. Pat. Nos. 1,677,688, "Aircraft" by A. Rees and 5,026,003, "Lighter-Than-Air Aircraft" by W. R. Smith.

Another approach has been the use of ducted and unducted propellers that can rotate from a position aligned with the longitudinal axis of the vehicle to a vertical position. This system, while providing upward and downward thrust, do not provide side thrust. Another disadvantage is the fact that, if the ducted fans are mounted on the cargo compartment or gondola, the exhaust therefrom will strike the gasbag when providing downward thrust, unless they are mounted on extremely long pylons. Furthermore, if the vehicle is very large, the ducted fans and the powerplants therefore, must also be large to provide sufficient cruising speed. This can create structural weight problems if the powerplants are integral with the ducted fans, for the mechanism for supporting and rotating the combination ducted fan and powerplant becomes quite large. Examples of rotatatable thruster can be found in British Patent Nos. 26,897, "Improvements In The Propulsion Of Aerial Or Water Vehicles by J. Macinante and 2,250,007A, "Aerobatic Airship" by S. Omiya, and U.S. Pat. Nos. 1,019,635, Adjustable Propeller" by F. Harlow, 1,868,976, "Aircraft Propelling Mechanism" by C. S. Hall, 1,879,345, Dirigible Air Sailing Craft" by A. H. Lawrence and 4,891,029, "Remote Control Lighter-Than-Air Toy" by J. M. Hutchinson.

In co-pending U.S. Pat. application Ser. No. 08/108280 "Propulsion System For A Lighter-Than-Air Vehicle" by J. B. Kalisz, et. al. a more versatile system is provided. This invention includes a pylon having a longitudinal axis and first and second ends, the first end of the pylon is rotatably mounted to the vehicle with the second end extending outward therefrom. The pylon is rotatable about its first end in a plane perpendicular to the longitudinal axis of the vehicle. A thrust producing assembly is mounted on the second end of the pylon and is rotatable about an axis of rotation in a plane perpendicular to the longitudinal axis of the pylon. A powerplant assembly is coupled to the thrust producing assembly to provide power thereto. Thus with the Kalisz,et al. invention, the pylon can be rotated 45 degrees downward and the thrust assembly can be rotated 90 degrees downward. This allows the exhaust from the thrust assembly to miss the gasbag. Additionally, the pylon can be rotated upward so that the thrust assembly is "out of the way" when the vehicle is docked. In both these inventions, the powerplant is preferably mounted on the vehicle (gondola) and is coupled by shafting to the thrust assembly, in the Kalisz, et. al. invention the shafting extends through the pylon. Alternately the powerplant could be mounted directly with the thrust assembly. U.S. Pat. Nos. 3,614,034, "V/STOL Aircraft" by R. E. Townsend and 3,451,648, "Aircraft Having Movable Engines For Vertical Take-Off And Landing" by O. E. Pabst, et al. disclose systems for retractable lift fans for Aircraft wherein dedicated lift engines are rotatable on support structure from a internally stored position to operation positions.

The problem is providing fuel efficient cruise powerplants and yet provide the high power required for docking, a two to one difference in power requirements. The proposed solution in the above two patent applications is to use a greater number of propulsion systems having fuel efficient diesel engines mounted in the gondola. However, mounting large diesel engines on the end of the pylon creates a significant weight penalty. Using turboshaft engines, that have very high thrust to weight ratios, mounted directly to the thrust assembly provides the required thrust for docking maneuvers, but cruise efficiency is be reduced.

Thus it is a primary object of the subject invention to provide a propulsion system for a lighter-than-air vehicle.

It is another primary object of the subject invention to provide a propulsion system for a lighter-than-air vehicle that provides increased maneuvering capability.

It is another primary object of the subject invention to provide a propulsion system that is both fuel efficient at cruise and also can provide the necessary increased thrust necessary during docking.

It is a further object of the subject invention to provide a propulsion system for a lighter-than-air vehicle that provides for the repositioning of the thrust producing assemblies, such as ducted and unducted fans or propellers, so that side thrust can be provided without exhaust therefrom striking the gasbag of the vehicle.

It is another object of the subject invention to provide a propulsion system for a lighter-than-air vehicle wherein the thrust producing assemblies, such as ducted and unducted and fans or propellers, can be positioned so as not to interfere with ground handling equipment when docking.

SUMMARY OF THE INVENTION

The invention is a propulsion system for a lighter-than-air vehicle of either the rigid or non-rigid type, having a longitudinal, horizontal and vertical axis. In non-rigid vehicles the cargo compartment and flight control station are suspended from the gasbag and, therefore, are called a gondola. In rigid vehicles, such structure can be integrated and need not be suspended. However, for purposes of discussion, the cargo compartment and flight station shall be referred to as the "cargo structure". In detail, there are a plurality of propulsion systems located in equal numbers on either side of the vertical axis thereof. Each propulsion system includes a thrust producing assembly that can be a fan, ducted fan, propeller, or ducted propeller. However, ducted fans or propellers are preferred from a safety standpoint for if there is a blade failure, the duct wall would prevent the blade from possibly ripping open the gasbag. Additionally, of the two, ducted propellers are preferred because of their higher efficiency at the low cruise speeds of such vehicles.

Preferably the thrust producing assembly is mounted on the end of a pylon that, in the cruise position, extends horizontally outward from the vehicle perpendicular to the longitudinal axis. If the vehicle is a non-rigid type, the pylon is attached to the gondola. On a rigid design, it is possible to attach the pylon to the main support structure; however, even with rigid designs, it is more desirable to attach the thrust producing assemblies on the cargo compartment to provide ease of access for maintenance, repair and removal. This is particularly true if the vehicle is extremely large.

The thrust assembly is rotatably mounted on the free end of the pylon, rotatable about an axis of rotation that lies in a plane perpendicular to the longitudinal axis of the pylon. Preferably, the thrust assembly is rotatable from a position wherein the thrust is directed forward to a position wherein the thrust is directed backwards, that is rotatable plus or minus one-hundred and eighty (180). Thus thrust can be directed vertically upward, vertically downward and to the rear. Note that if thrust reversing propellers or fans are used, rotation could be limited to plus or minus ninety (90) degrees. Rotation of the thrust assemblies is accomplished by a first actuation assembly mounted on the end of the pylon. A suitable first actuation assembly comprises a ring gear mounted on the thrust assembly engaging a pinon gear attached to the output shaft of a hydraulic or electrical motor mounted on the pylon. The use of such a gear assembly allows for the "locking" of the thrust assembly in any selected position; however, other mechanisms can be used. It is also important to note that the thrust axis of each of the thrust producing assemblies can be individually positioned to provide a wide variety of "thrust vectoring" combinations as a further aid in maneuvering the vehicle.

The pylon is rotatably mounted to the vehicle such that the thrust assembly can be positioned by a second actuation system upward and downward from the horizontal. Typically, this is a jack screw assembly mounted on the vehicle with the end of the jack screw attached to the pylon. Upward positioning is desirable in order to clear ground support equipment when the vehicle is docked. The downward position is desirable when the thrust assembly is rotated at ninety degrees to provide side and downward directed thrust. The adjusting of the thrust assembly to provide downward thrust, in conjunction with the positioning of the pylon in the downward position, allows the exhaust to be directed at an angle so as to miss the gasbag. This is particularly advantageous when the thrust assembly is mounted on the cargo structure below the gasbag and thus positioned well under.

Preferably the power to the thrust assembly is provided by a powerplant assembly that includes a fuel efficient powerplant assembly mounted on the vehicle and a high thrust, low weight powerplant assembly mounted directly to the thrust producing assembly. In the case of a non-rigid airship, the fuel efficient powerplant assembly is mounted in the gondola structure. The fuel efficient powerplant assembly is coupled to the thrust producing assembly via drive shafts and universal joints and a transmission assembly so that rotation of the pylon and thrust assembly can be accomplished. Additionally, a clutch is incorporated into the drive train so that the fuel efficient powerplant assembly can be disconnected from the thrust producing assembly. The high thrust, low weight powerplant is preferably a turboshaft engine coupled directly to the thrust producing assembly and which can be de-coupled by a clutch. Since the preferred fuel efficient powerplant assembly includes diesel engines that have a relatively low power to weight ratio, mounting them in the vehicle, while coupling the high thrust, low weight powerplant assembly (turboshaft engine) directly to the thrust producing assembly makes sense from a weight savings point of view. The weight penalty associated with mounting the diesel engines directly to the thrust producing assembly would be significant and the overall design of the propulsion system is simplified. This is readily apparent when one considers that a 40,000 shaft horsepower turboshaft engine ways less than a 3000 horsepower diesel engine.

In a second embodiment the thrust assembly is rotatably mounted on the free end of a fixed position pylon or other rigid structure, rotatable about an axis of rotation in a plane at an acute angle to the vertical axis. Preferably, the thrust assembly is rotatable plus or minus 180 degrees in that plane. Thus upward (lifting) directed thrust is available for takeoff, while downward directed thrust can be used for docking, and reverse and side thrust is available for both maneuvers. The acute angle of the plane in which the thrust assemblies rotate should be sufficient so that the exhaust therefrom will miss the gasbag when down thrust is required, however, this angle can be increased beyond the amount needed to clear the gasbag should it be determined that a larger percentage of side force relative to either the upward or downward directed thrust, is needed to control the vehicle. Of course, if the propellers or fans are reversible, then rotation can be limited to plus or minus 90 degrees in the acute angle plane. Thus the thrust assemblies should be rotatable at least plus or minus 90 degrees in their plane of rotation.

As in the first embodiment, it is desirable to mount the fuel efficient powerplant assembly in the cargo structure and provide power to the thrust producing assembly via a drive shaft mounted within the fixed position pylon. A gear box is mounted on the end of the pylon coupled to the output shaft of the powerplant providing the desired angular change in direction. The high thrust, low weight powerplant assembly, as in the previous embodiment, is mounted directly to the thrust producing assembly. Rotation of the thrust producing assembly is accomplished by an actuation assembly mounted on the end of the pylon similar to the one in the first mentioned embodiment. Again, it is important to note that the thrust axis of the thrust producing assemblies can be individually positioned to provide a wide variety thrust vectoring combinations as a further aid in maneuvering the vehicle.

In operation, for takeoff, the high thrust, low weight, turboshaft engines are clutched in and on-line and the diesel engines are off-line. When cruise conditions can be assumed, the turboshaft engines are de-clutched and taken off-line and while the diesels are simultaneously brought on-line. When docking the opposite procedure is used. However, it is possible to simultaneously use both the diesels and turboshaft engines, if the additional power is required.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 3 is an enlarged view of a thrust assembly illustrating some of the various types thereof that can be used in the subject propulsion system.

FIG. 4A is an enlarged partial view of FIG. 2 particularly illustrating the propulsion system with the thrust assembly in the cruise position.

FIG. 4B is a view similar to FIG. 4A illustrating the propulsion system with the thrust assembly in the docking (maneuvering) position.

FIG. 4C is a view similar to FIG. 4A illustrating the propulsion system with the thrust assembly in the docking (maneuvering) position with the thrust assembly rotated downward.

FIG. 4D is a view similar to FIG. 4A illustrating the propulsion system with the thrust assembly in the docked position.

FIG. 5 is a top view of the propulsion system shown in FIG. 4 taken along the line 5—5.

FIG. 7 is a partial cross-sectional view of FIG. 5 taken along the line 7—7.

DESCRIPTION OF THE PREFERRED EMBODIMENT

Figure 1:
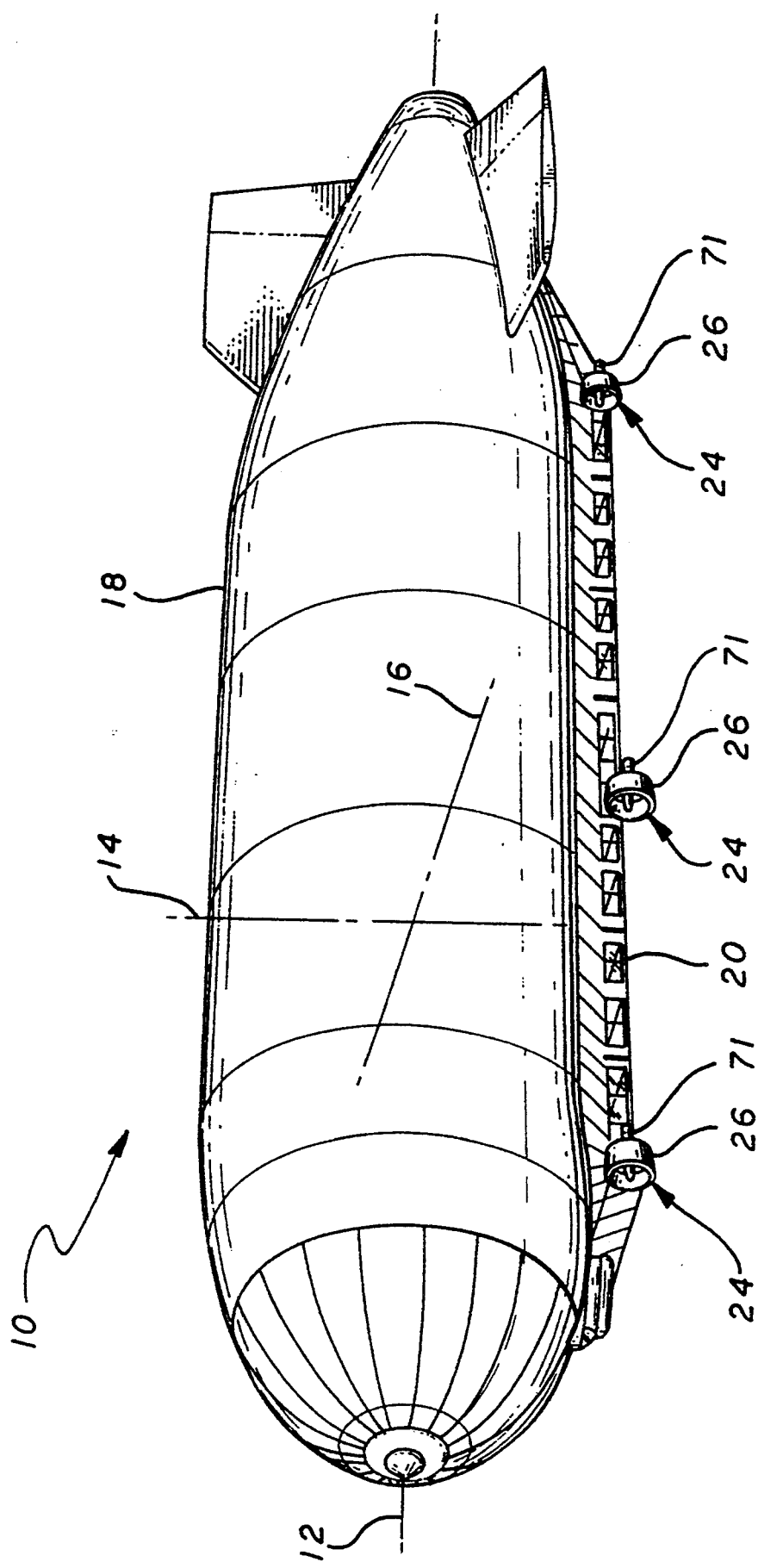
FIG. 1 is a perspective view of a lighter-than-air vehicle incorporating the subject propulsion system.
Figure 2:
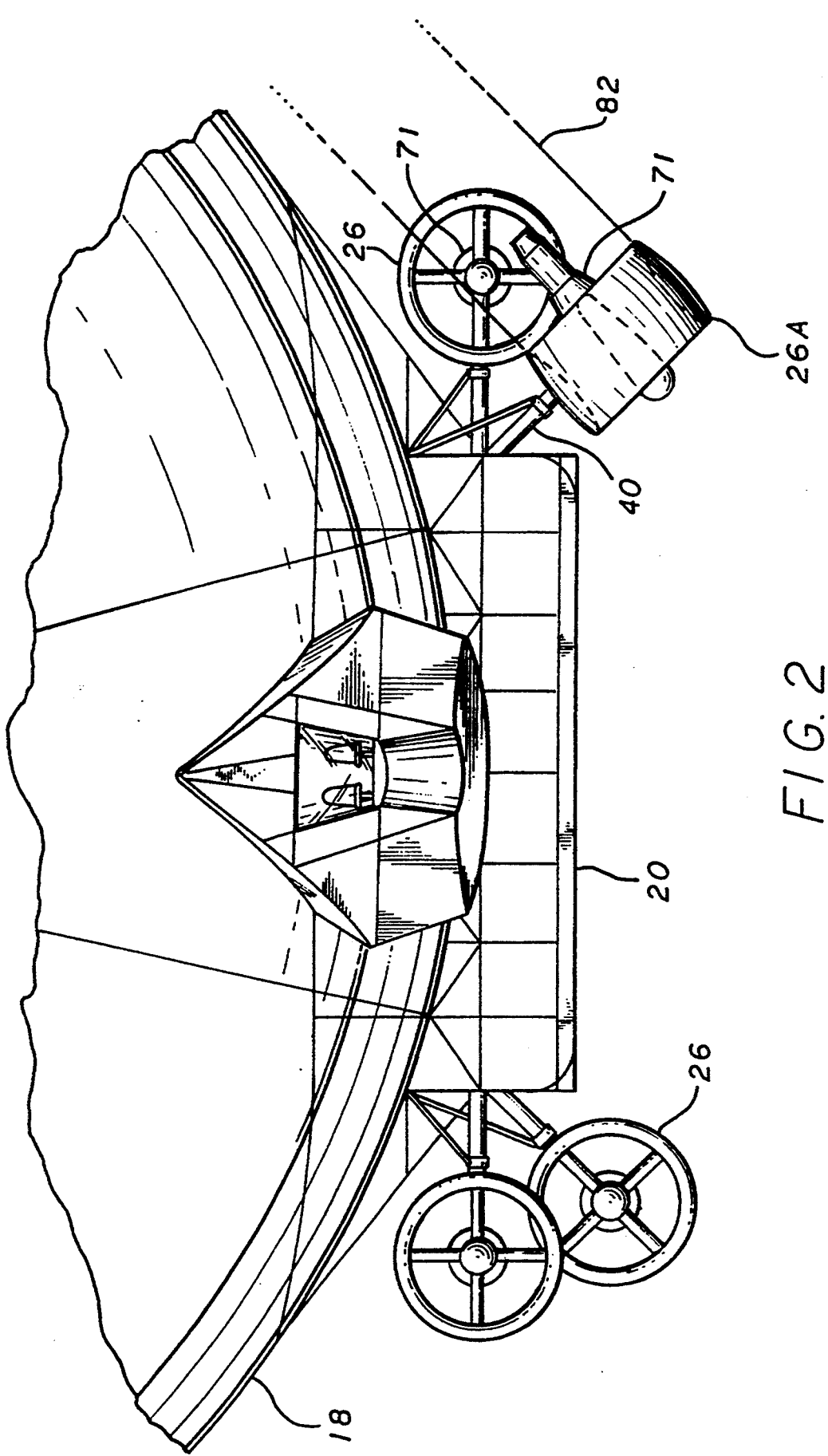
FIG. 2 is a partial front view of the vehicle shown in FIG. 1.

Illustrated in FIGS. 1 and 2 is a lighter-than-air vehicle incorporating the subject propulsion system. The vehicle, designated by numeral 10, is a non-rigid design having a longitudinal axis 12, vertical axis 14, and horizontal axis 16 and includes a helium bag 18 with a cargo structure 20, in the form of a gondola, mounted at the bottom. It should be noted that the propulsion system could also be used on a rigid vehicle design. In addition, whereas a gondola type cargo compartment (suspended cargo compartment) is necessary on a non-rigid vehicle it is certainly not required on a rigid design. Thus a gondola style cargo compartment is also for purposes of illustration only and, again, hereinafter generally referred to as a cargo structure. The vehicle 10 includes six separate propulsion systems 24 having thrust producing assemblies, in the form of ducted propellers 26 mounted along the cargo compartment 20, three on each side (only those on the left side are shown in FIG. 1). However, as shown in FIG. 3, ducted fans 27, as well as unducted propeller and fans assemblies, 28 and 29, respectively, could be substituted and, therefore, the use of ducted propellers, and the number of thrust assemblies for that matter, is for purposes of illustration only. Additionally, propellers or fans can and, preferably, are reversible.

Figure 6:
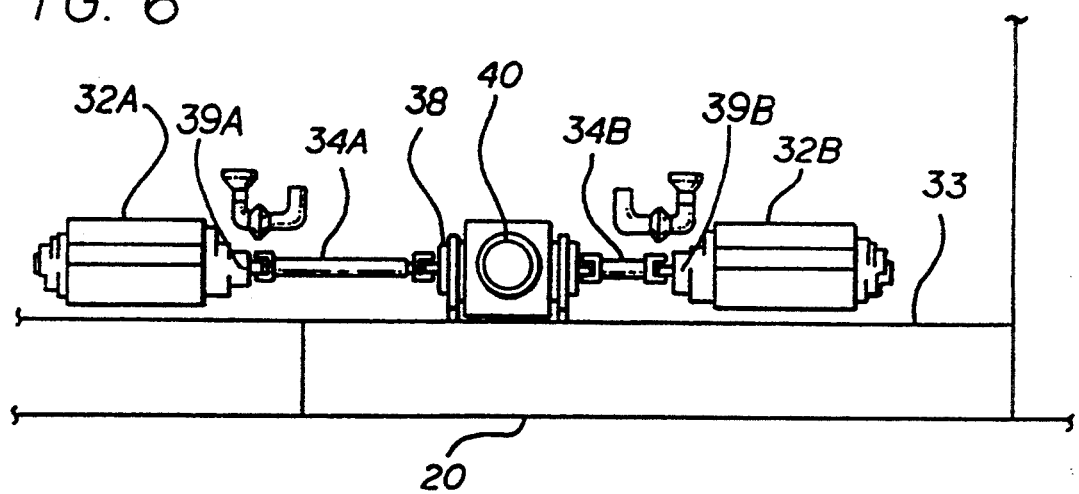
FIG. 6 is a side view of the powerplants of the propulsion system shown in FIG. 5 taken along the line 6—6 in FIG. 5.

Still referring to FIGS. 1 and 2 and, additionally, to FIGS. 4A, B, C and D, as well as FIGS. 5, 6 and 7, it can be seen that each propulsion system 24 includes a pair of fuel efficient engines such as diesel engines 32A and 32B mounted on the floor 33 of the cargo compartment 20. While two diesel engines are shown, it should be understood that, in some vehicles, a single engine would suffice. Additionally, other types of fuel efficient engines could be used. The engines 32A and 32B have drive shafts 34A and 34B on a common centerline 36 that couple to a transmission assembly 38 rotatably mounted to the floor 33. Both engines 32A and 32B incorporate clutches 39A and 39B, respectively, so that either or both can be disconnected from the ducted propeller 26. A pylon 40 is coupled by its first end 42 to the transmission assembly 38 and by its second end 44 to the ducted propeller 26. The pylon 40 is hollow and contains a drive shaft 46 mounted therein that connects from the transmission assembly 38 to the ducted propeller 26 for driving same. A sway brace 52 is pivotally mounted by a first end 54 to the cargo compartment 30 on the centerline 36 of the drive shafts 34A and 34B, and by its second end 56 to the pylon 40 for reacting thrust loads on the pylon. An actuation assembly in the form of a jack screw 60 is mounted on the cargo compartment 20 having an end 62 of the screw attached to the pylon 40 for rotating the pylon about the centerline 36.

The ducted propeller 26 includes individual propeller blades 64 rotatably mounted on a centerbody 66. The centerbody also supports the duct 68 by means of struts 70. The second end 44 of the pylon 40 extends through the duct 68 (the duct is rotatable thereabout) and couples to and supports the centerbody 66 by thrust bearings (not shown). The drive shaft 46 couples to a gearbox 67 that drives the propeller blades 64. Mounted to the ducted propeller 26 is a high output, light weight powerplant assembly in the form of a turboshaft engine 71 that is coupled to the gearbox 67 via a drive shaft 72. A clutch 73 is incorporated so that the turboshaft engine 71 can be disconnected from the propellers when not in operation.

Rotation of the ducted propeller 26 is accomplished by an actuation assembly 74 mounted on the pylon that includes a motor 76 having a pinon gear 78 that engages a ring gear 80 attached to the duct 68. Thus rotation of the ducted propeller 26 about the pylon 40 can be accomplished regardless of the pylon's position. If the ducted propeller is reversible, it need only rotate plus or minus 90 degrees; if not, it should be rotatable a full 180 degrees.

Referring to FIGS. 4A,B,C,and D, in operation, the pylon 40 can be rotated from its cruise position 40 (FIG. 4A) to the docking or maneuvering position 40A (FIG. 4B) by actuation of the jack screw 60. In such maneuvers, the diesel engines 32A and 32B can be brought off-line by actuation of the clutches 39A and 39B and the turboshaft engine 71 simultaneously brought on-line. When docking, the ducted propeller 26 can be rotated ninety degrees, indicated by numeral 26A (FIG. 4C), to provide both downward and side thrust or upward and side thrust, as desired. Note that the exhaust, indicated by numeral 82, misses the gasbag 18. Thus in any design, the length and the angle of the pylon is rotated should be sufficient to allow the exhaust from the thrust assembly to miss the gasbag, when producing downward directed thrust. When docking lines (not shown) are secured, the pylon 40 can be rotated upward to the docked position 40B (FIG. 4D), wherein the ducted propeller 26 is out of the way of any ground based docking structure (not shown). It should be noted that on the vehicle illustrated in FIG. 1, there where six ducted propellers 26 incorporated and by independently adjusting the rotational position of each, as well as pylon 40 position, considerable latitude in thrust vectoring between ducted propellers is possible. For takeoff, the reverse procedure is followed, i.e., the turboshaft engine 71 is brought on-line and the diesels are taken off-line. After takeoff is accomplished, the turboshaft engine 71 is deactivated and de-clutched from the propellers 64 and the diesel engines 32A and 32B simultaneously brought on-line and clutched in. Of course, for takeoff or docking both engines can remain on-line if the extra power is required.

Figure 9:
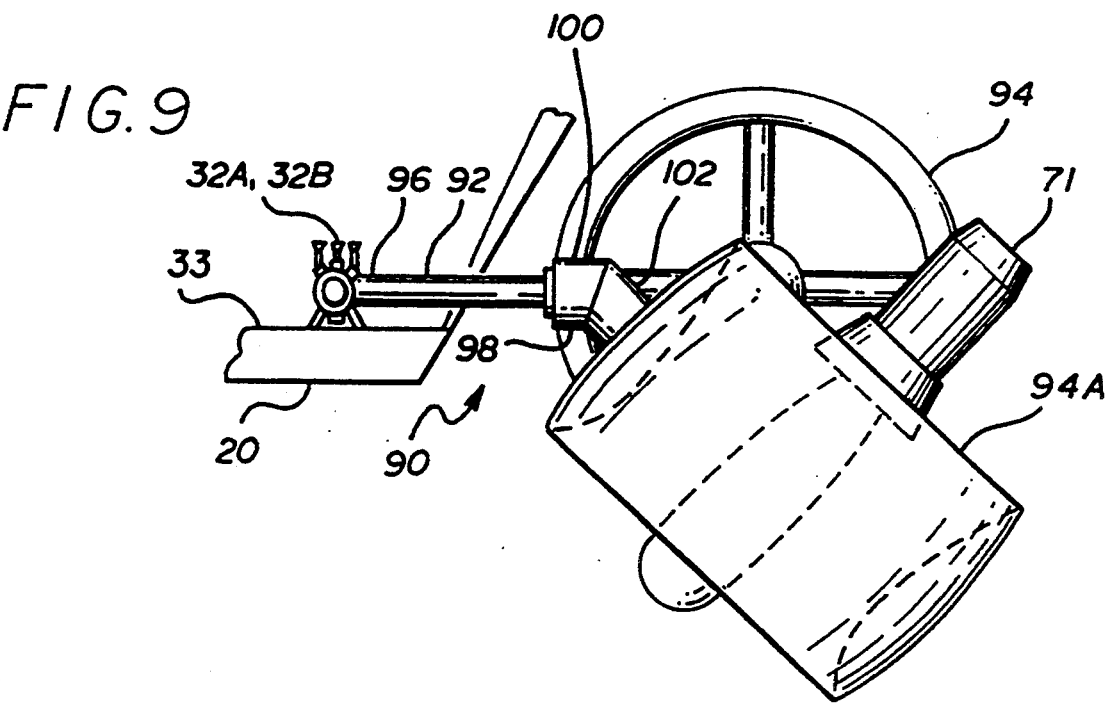
FIG. 9 is an enlarged view of a portion of FIG. 7 partially broken away to illustrate the details of the propulsion system.
Figure 8:
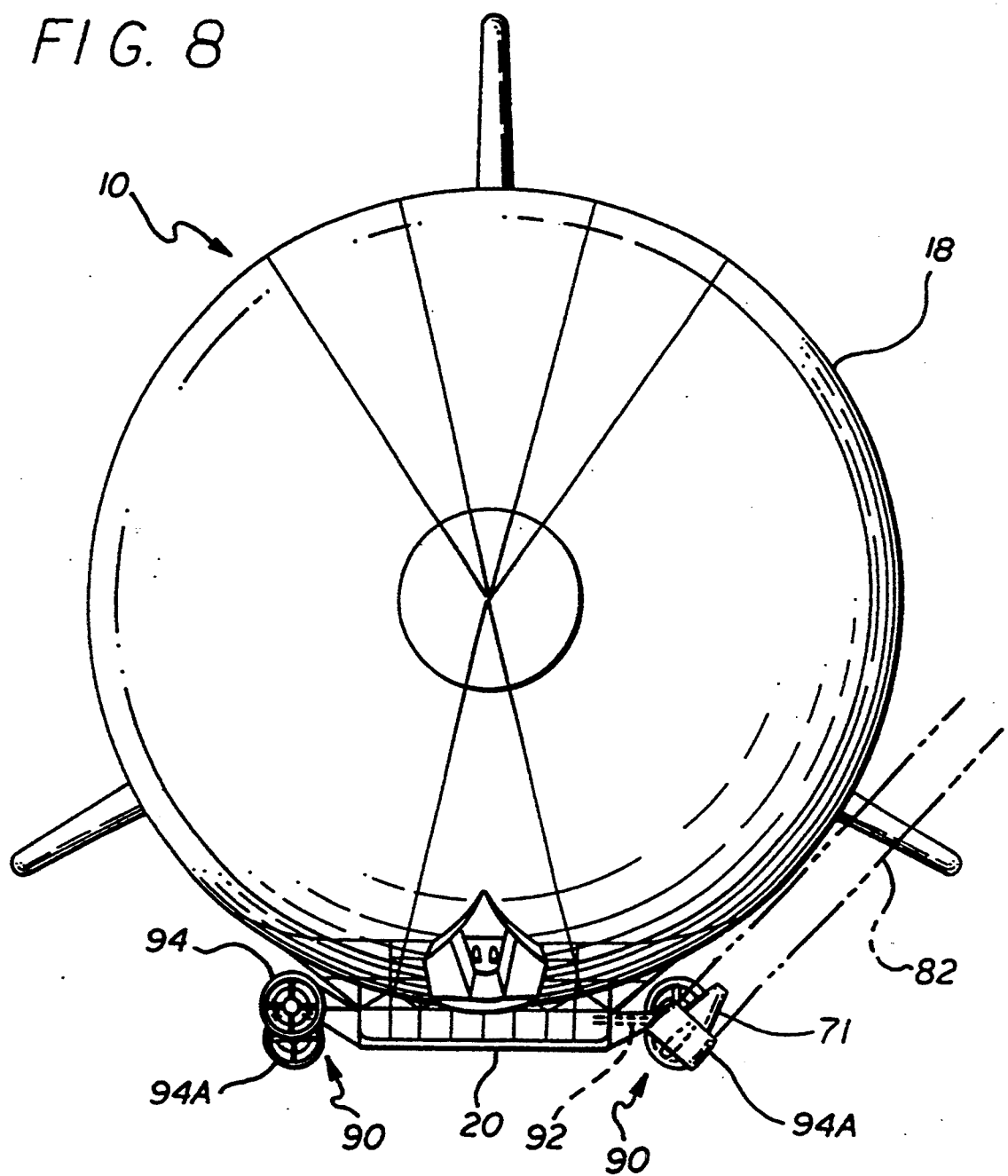
FIG. 8 is a view similar to FIG. 2 illustrating an alternate embodiment of the propulsion system wherein the pylon is stationary and the thrust assemblies are rotatable in a plane at an acute angle to the vertical axis of the vehicle.

Illustrated in FIGS. 8 and 9 is a second embodiment of the propulsion system, generally indicated by numeral 90, wherein a fixed pylon 92 is used to support a ducted fan 94, The power plants 32A and 32B are coupled to a transmission assembly (not shown) that is fixed to the cargo floor 33. The first end 96 of the pylon 92 is coupled to the transmission assembly (not shown in FIGS. 8 and 9) while the second end 98 is coupled to the ducted fan 94 through a gearbox 100. The gearbox provides an angular change in the plane of rotation, with the angle selected so that the exhaust from the thrust assembly misses the gasbag when it is rotated to provide downward directed thrust (as illustrated by a forty-five (45) degree gearbox 100). An actuation assembly 102, similar to actuation assembly 74, is used to rotate the ducted fan 94 plus or minus 90 degrees or 180 degrees if the ducted fan 94 incorporates reversible fan blades. This propulsion system allows for side thrust to be generated during docking. However, there is no capability to move the ducted fan upward when in the docked position. It does have the advantage of providing side thrust with a somewhat simpler system.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft industry.

We claim:

1. A propulsion system for a lighter-than-air vehicle, the vehicle having a longitudinal, lateral and vertical axis, said propulsion system comprising:
   - a pylon having a longitudinal axis and first and second ends, said first end of said pylon rotatably mounted to the vehicle and said second end extending outward from the vehicle, said pylon rotatable about said first end in a vertical plane perpendicular to the longitudinal axis of the vehicle in an upward direction and in a downward direction;
   - a thrust producing assembly rotatably mounted on the second end of said pylon; said thrust producing assembly rotatable at least plus or minus ninety degrees in a plane perpendicular to the longitudinal axis of said pylon,
   - a powerplant assembly coupled to said thrust producing assembly to provide power thereto, said powerplant assembly comprising;
     - a fuel efficient powerplant assembly mounted within the vehicle having sufficient power for cruise conditions, said fuel efficient powerplant having an output drive shaft coupled to said thrust producing assembly;
     - a light weight high power powerplant assembly mounted directly to said thrust producing assembly having sufficient power for docking conditions;
     - first clutch means for de-coupling said fuel efficient powerplant from said thrust producing assembly; and
     - second clutch means for de-coupling said light weight high power powerplant from said thrust producing assembly; and
   - means to rotate said thrust producing assembly about said second end of said pylon; and
   - means to rotate said pylon about said first end.

2. The propulsion system as set forth in claim 1 wherein said thrust assembly is selected from the group consisting of fans, ducted fans, propellers and ducted propellers.

3. The propulsion system as set forth in claim 2 comprising:
   said means to rotate said thrust producing assembly about said axis of rotation is mounted on said pylon.

4. The propulsion system as set forth in claim 3 wherein said pylon is rotatable about said first end upward and downward from a plane parallel to the lateral axis of the vehicle.

5. The propulsion systems set forth in claim 4 wherein the vehicle includes a cargo compartment mounted on the bottom of the vehicle, said propulsion system comprising pylon rotatably mounted to the cargo compartment; and said fuel efficient power plant mounted in the cargo compartment.

6. The propulsion system as set forth in claim 5 comprising:

said fuel efficient powerplant assembly having an output shaft;

a transmission assembly coupled to said output shaft and having a second output shaft, said transmission assembly rotatably mounted to the cargo compartment having an axis of rotation coincident with said pylon;

said first end of said pylon attached to said transmission assembly; and said second output shaft mounted within said pylon and coupled to said thrust producing assembly.

7. The propulsion system as set forth in claim 6 wherein said means to rotate said assembly about said axis of rotation comprises:

a ring gear mounted on said thrust assembly; and a motor mounted on said pylon, said pylon having a pinon gear mounted thereon in engagement with said ring gear;

such that rotation of said pinon gear by said motor causes said thrust assembly to rotate.

8. The propulsion system as set forth in claim 7 wherein said second means comprises a jack screw mounted on said vehicle, said jack screw having an output shaft coupled to said pylon, such that the extension and retraction of said output shaft causes said pylon to rotate downward and upward about said first end.

9. The propulsion system as set forth in claim 1, or 2, or 3, or 4, or 6, or 7, or 8, wherein said thrust producing assembly includes reversible thrust capability.

10. The propulsion system as set forth in claim 9 wherein said thrust assembly is rotatable plus or minus one-hundred and eighty degrees.

* * * * *